United States Patent [19]
Syljeset et al.

[11] Patent Number: 5,379,798
[45] Date of Patent: Jan. 10, 1995

[54] HYDRAULIC COUPLING

[75] Inventors: Jan E. Syljeset; Hakon Stromberg, both of Oslo; Torbjorn Berg, Sorumsand, all of Norway

[73] Assignee: Kvaerner Energy A.S., Oslo, Norway

[21] Appl. No.: 237,398

[22] Filed: May 3, 1994

[30] Foreign Application Priority Data

May 18, 1993 [NO] Norway .................. 931797

[51] Int. Cl.⁶ .............................. F16L 37/28
[52] U.S. Cl. .................... 137/614.04; 137/614.01; 251/367; 251/368; 277/206 R
[58] Field of Search ............ 251/149.7, 368, 367; 137/614.04, 614.01, 614, 614.02, 614.03; 277/205

[56] References Cited
U.S. PATENT DOCUMENTS

| | | | |
|---|---|---|---|
| 3,586,048 | 6/1971 | Arnold | 137/614.04 |
| 4,453,566 | 6/1984 | Henderson, Jr. et al. | 137/614.02 |
| 4,817,668 | 4/1989 | Smith, III | 137/614.04 |
| 4,832,080 | 5/1989 | Smith, III | 137/614.04 |
| 5,099,882 | 3/1992 | Smith, III | 137/614 |

Primary Examiner—A. Michael Chambers
Attorney, Agent, or Firm—Young & Thompson

[57] ABSTRACT

A hydraulic coupling comprising a first part having at least one check valve, a second part having at least one check valve, and a seal plate designed to be placed between the first and second parts. The first part, second part and seal plate are oriented in relation to one another. At least one connecting member disposed in the seal plate to establish communication between the interdependent check valves. In the extension of each check valve there is disposed a cylindrical surface, the center axis of which coincides with that of the check valves, and said connecting member is at each end formed with partial, open spherical cups for external sealing interaction with the cylindrical surfaces, the internal spherical surfaces being subjected to the same pressure as that in the medium which passes through the valves and the connecting member for the purpose of actuating the radial forces in the spherical cup. On the outside of the hydraulic coupling a tool can be used to carry out the coupling operation. Alternatively, a permanent coupling clamp can be used which holds the parts together for as long as is required.

9 Claims, 3 Drawing Sheets

HYDRAULIC COUPLING

The present invention relates to a hydraulic coupling comprising a first part having at least one check valve, a second part having at least one check valve, a seal plate designed to be placed between the first and second parts, orienting members which orient the first part, second part and the seal plate in relation to one another, and at least one connecting member disposed in the seal plate forming communication between the interdependent check valves.

Hydraulic couplings of this kind are used for coupling one or more fluid-carrying pipelines, especially for use in the subsea coupling of two horizontally running pipelines, each containing a plurality of single lines, or to connect one such pipeline to a seabed installation. It can, for example, be used to connect pipelines filled with hydraulic oil for controlling valves on subsea equipment. However, the coupling can, of course, be used in many other contexts.

The present hydraulic coupling has been especially developed to cope with horizontal couplings because additional demands are made on the structure thereof in comparison with vertical couplings. In the case of a vertical coupling, it is usual for one of the flanges to be lowered down onto the other, thus how protracted the required movement is from the time the coupling elements first come into engagement with one another until the coupling is sealed is of little consequence. However, in the case of horizontal couplings, both pipelines that are to be coupled have usually been laid prior to the start of the coupling operation. It is therefore vital that the coupling does not require protracted movement from the time the coupling elements first come into engagement with one another until the coupling is sealed.

In the case of vertical couplings, it is therefore usual to use packer elements that are a part of one of the flanges, and project forwards far enough to have sufficient flexibility to accommodate dimensional variance between the flanges. In the case of horizontal couplings, it is preferable to use packer elements that seal against both flanges, and that are placed in a coupling plate or seal plate that can be changed without the pipelines being raised.

There are a number of previous coupling structures involving metal-against-metal packer elements where the internal pressure in the coupling helps to keep the connection sealed. Some of these use cylindrical faces of contact and packer elements which are deformed elastically so that they can be used several times. Structures wherein one of the sealing surfaces is spherical are also known. An example of a coupling of this kind is taught in U.S. Pat. No. 4,817,668.

Furthermore, there are couplings wherein a plurality of pipes are connected in common flanges, where tubular packer elements are mounted with clearance in a coupling plate in such a way that they are able to adjust to dimensional variance in the flanges.

A common structure of this type uses AX packers. AX packers consist of a conical spigot which is pressed with great force into a conical hole which has a somewhat larger conical angle. The packer elements are deformed plastically and consequently must be changed if the coupling has to be dismantled. In spite of the plastic deformation of the sealing surfaces, couplings of this kind are dependent upon the flanges being so thick that they are sufficiently stable dimensionally, their being pressed against one another with sufficient axial thrust, and the sealing surfaces being deformed plastically to a sufficient degree. This entails requirements of more restricted tolerances in the axial direction, and furthermore that the arrangement of pipes in the flange is selected so that the total of the large axial forces exerted by the packers act axially and near the centre line of the flanges.

It is apparent that the disadvantages that one finds with AX packers are avoided if radially acting packers are used, plastic deformation only is used to obtain the surface pressure required for sealing, and sealing surfaces are formed in such a way that they, in principle, seal regardless of whether there is an angle variance between the centre lines of the parts that are to be coupled.

As will be understood from the above, it is a main objective of the invention to provide a hydraulic coupling where it is not necessary to use great axial thrust in the coupling in order to keep the coupling sealed. It is also a major objective to be independent of totally accurate orientation or alignment between the parts that are to be coupled together. This means that minor angle variances between the centre lines of the parts are accommodated without any difficulty. As will be understood, this is of particular significance when many pipelines in a bundle are to be coupled together by means of the hydraulic coupling.

Thus lighter flanges, thinner seal plates and less complex orienting members can be used without there being any loss of reliability.

In accordance with the present invention, there is provided a hydraulic coupling of the kind mentioned by way of introduction, which is characterized in that in the extension of each check valve a cylindrical surface is disposed, the centre axis of which coincides with the centre axis of the check valve, and said connecting members are at each end made with partial, open spherical cups for external sealing interaction with the cylindrical surfaces, the internal spherical surfaces being subjected to the same pressure as that in the medium which passes through the valves and the connecting member for the purpose of actuating the radial forces in the spherical cup.

It would be of advantage if for the spherical cup of the coupling member one were to choose a material with a smaller modulus of elasticity than the material in the parts with the cylindrical surfaces.

It would be to advantage if each coupling body were loosely fixed in the seal plate for the purpose of accommodating angle variances between the check valves in the respective first and second parts.

Each coupling member can be made of a titanium alloy, the modulus of elasticity of which is approximately half of the elastic modulus of steel.

The insertion end of said cylindrical surface can be slightly conical or convex in shape in order to facilitate the entering of the coupling member.

In order to increase the surface pressure against the cylindrical surfaces, the external diameter of the spherical cup can be somewhat larger than the diameter of the internal cylindrical surface.

In order to further ensure good sealing, the cylindrical surface can be slightly conical and decrease in conicity from 0° to 10° in the direction of the check valve.

In order to further ensure the reliability of the sealing surfaces, the spherical cups can be plated or surface-treated with a soft metal, for instance, silver, gold, lead or a white metal.

Since the external diameter of the spherical cup is chosen to be somewhat larger than the diameter of the internal cylindrical surface, the spherical cup is compressed elastically in the radial direction, whereby the sealed connection is formed between the spherical surface and the cylindrical surface. If the spherical cup is made of titanium, the radial compression of the spherical zone can be in the region of 0.1 mm at the equator. As stated previously, the modulus of elasticity of steel is approximately twice that of titanium. If steel is used in the packer element, the radial compression must be limited to approximately half that of obtained with titanium. It follows that titanium allows greater machining tolerances and generally makes the structure less sensitive, but that steel is also utilisable.

It must also be stressed that when the connection is subjected to internal pressure, the compressive forces on the spherical zone will be transmitted through the contact surface to the first and second parts. The contact pressure thereby increases in step with the pressure differential above the packer so that said packer remains sealed irrespective of pressure, as far as the limits set by the materials and dimensions used allow. Furthermore, it is evident that the seal is not dependent upon the axial thrust with which the flanges are held together, nor as mentioned, is it dependent upon the two cylindrical sealing surfaces being concentric or in alignment with one another.

As mentioned, it follows from these properties that the structure is virtually insensitive to dimensional variances or angle variances, in such a way that it is suitable for connecting a large number of pipes mounted in common flanges, and furthermore that it tolerates dimensional changes as a result of thermal expansion, compressive forces or external forces including the strain caused by accidents. Since the sealing surface is deformed elastically, and the deformation is determined during manufacture and not during the connection, the sealing surfaces can be used several times.

Other and additional objectives, features and advantages will be made apparent in the following description of what is, for the time being, a preferred embodiment of the invention, which is given for the purposes of description without thereby being delimitative, and given in conjunction with the attached drawings where:

Figure 1:
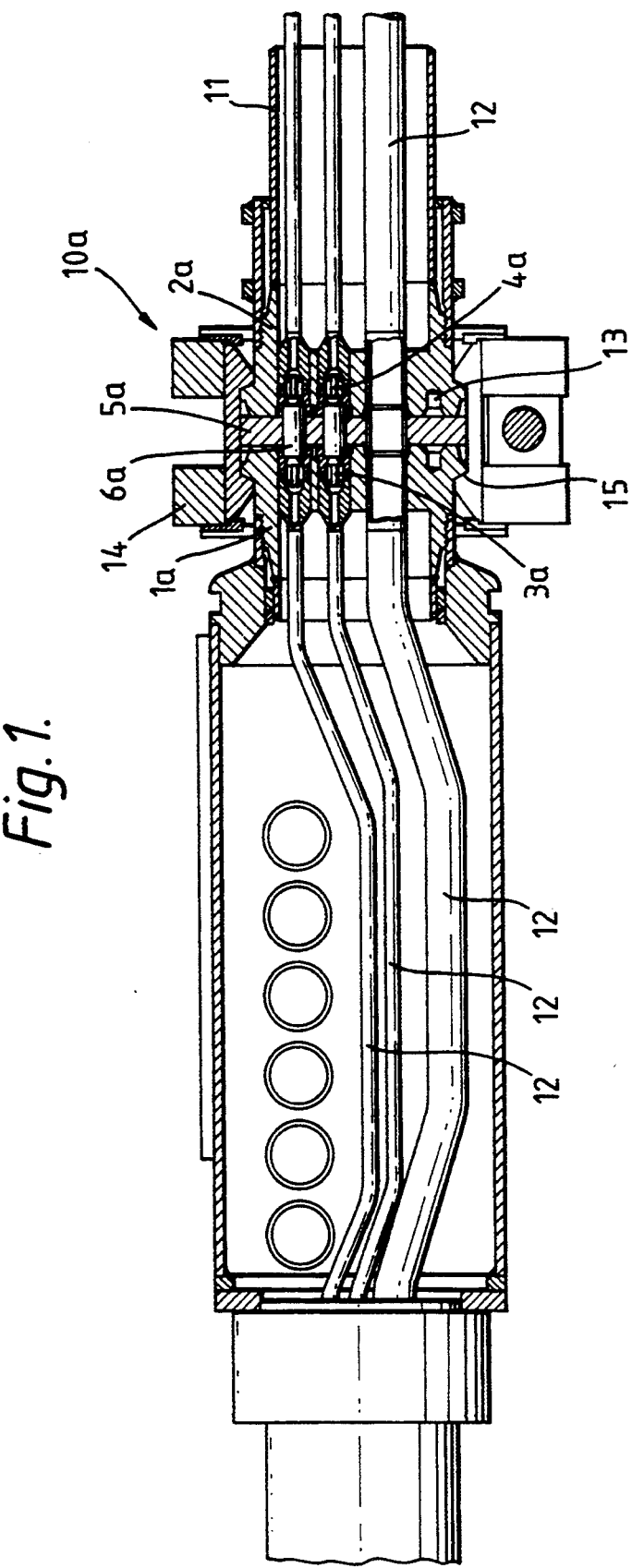
FIG. 1 is a schematic illustration in a partial longitudinal section of a general hydraulic coupling which joins two bundles of pipes, where the hydraulic coupling according to the present invention can be used.

FIG. 1 depicts a general coupling unit 10a for coupling two bundles of pipes 11 together. Each bundle of pipes 11 consists of several individual pipes 12 as illustrated in FIG. 1. Each bundle of pipes 11 ends in respective flange parts 1a and 2a. Between the flange parts 1a and 2a there is disposed a seal plate 5a. It would be of advantage if the seal plate 5a were equipped with orienting members, such as the illustrated guide pins 13. It will thus be understood that the guide pins 13 orient the flange parts 1a and 2a and the seal plate 5a in relation to one another.

In each flange part 1a and 2a several check valves 3a,4a are disposed that are positioned in the end flanges 1a,2a in such a way that they are substantially in alignment with one another when they are oriented by means of the guide pins 13.

On the outside of the pipeline flanges 1a,2a, lies a segmented clamp 14 which can convert radially acting forces to axially acting forces for the purpose of drawing the pipeline flanges 1a, 2a together and towards the seal plate 5a. The conversion from radial forces to axial forces takes place by means of inclined surfaces 15 on the end flanges 1a,2a and correspondingly inclined surfaces on the clamp 14.

The segmented clamp 14 can act as a tool for drawing the parts together, whereupon the pipeline flanges are screwed together or held together in another manner, so that the tool in the form of the clamp can be removed. Alternatively, the clamp can encompass the coupling permanently for as long as it is desirable to keep the flanges connected to one another.

Figure 2:
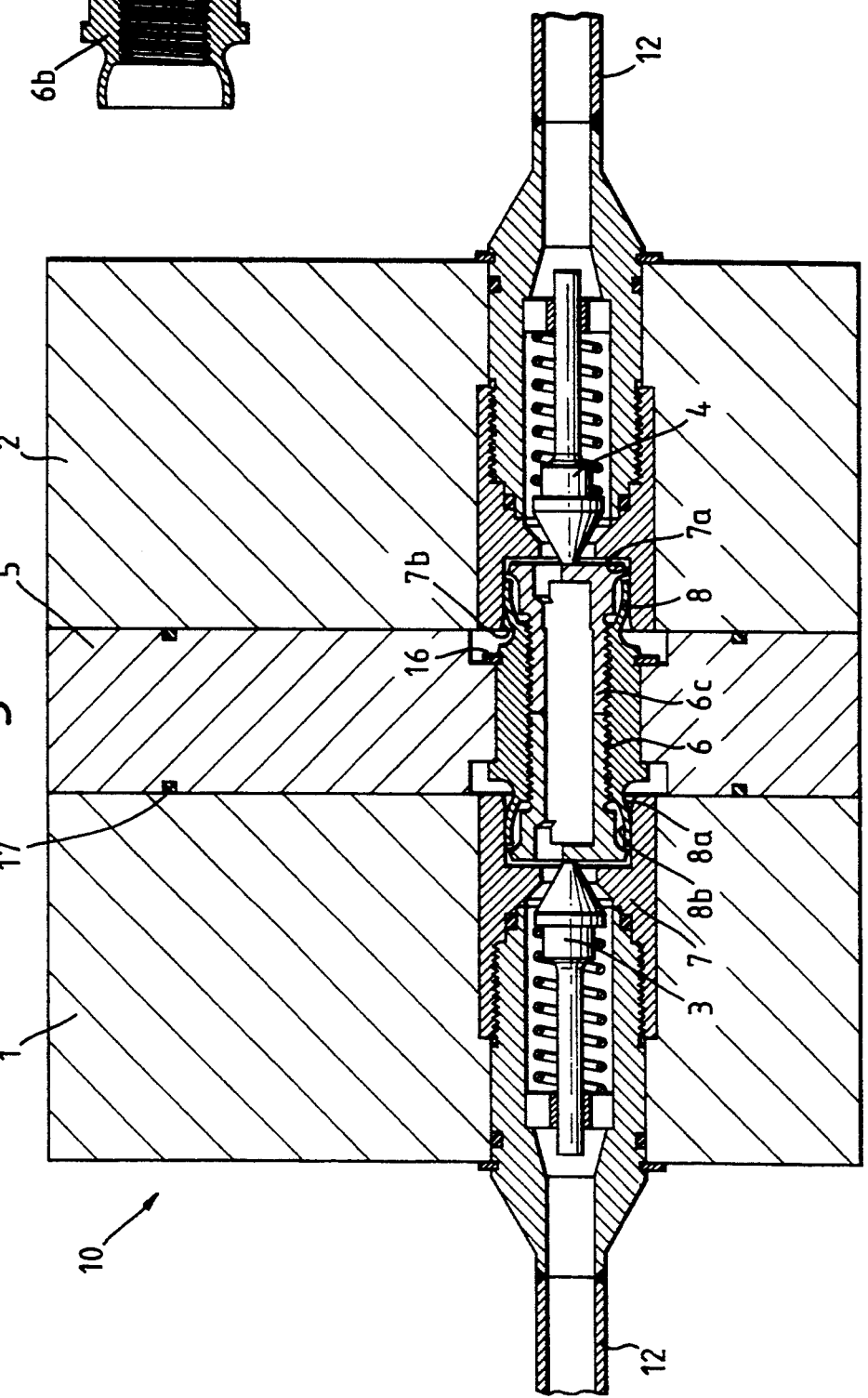
FIG. 2 is an outline section of a part of a hydraulic coupling according to the present invention.

FIG. 2 shows a part of a hydraulic coupling 10 which can be used in the coupling 10a according to FIG. 1. The hydraulic coupling 10 comprises a first part 1 which has at least one check valve 3 disposed therein. The number of check valves and pipelines can be chosen as required. The coupling also comprises a second part 2 which has a plurality of check valves 4 which correspond to the number in the first part 1. Between the first part 1 and the second part 2, a seal plate 5 is disposed which retains a connecting member 6 by means of a lock ring 16. There is a clearance between the seal plate 5 and the outer surface of the connecting member 6 such that this is loosely fixed in the seal plate 5. This is done intentionally in order to be able to accommodate small angle variances between the pipelines, or the check valves 3,4, which are to be connected. The orienting members (not illustrated in FIG. 2) are disposed in the coupling in order to orient the first part 1, the second part 2 and the seal plate 5 in relation to one another so that the respective check valves 3,4 and accompanying pipelines 12 substantially correspond with or are in alignment with one another.

Furthermore, each check valve 3,4 has an extension 7 which is also disposed in the first and second parts 1,2 or constitutes a part thereof. The extension 7 has, in the end that faces the seal plate 5, a recess in the shape of a cylindrical surface 7a. As illustrated, the surface 7a can in its entry portion 7b be convex or conical in shape.

Figure 3:
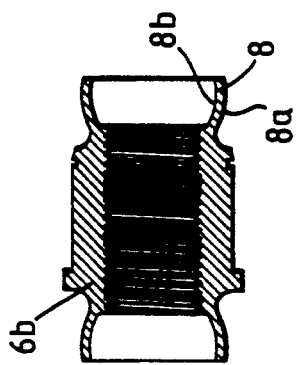
FIG. 3 is a longitudinal section through a part of a connecting member mounted on a seal plate.

FIG. 3 is a more detailed illustration of the external part 6b of the connecting member 6. At each end of the external part 6b are disposed spherical cup-like lips 8 having an external surface 8a and an internal surface 8b. The external surface 8a is designed for compressed interaction with the internal cylindrical surface 7a of the extension 7. The convex surface 7b is formed thus to facilitate the entering of the spherical cup 8 in the cylindrical surfaces 7a, especially if the check valves 3,4 are not in complete alignment with one another. It should be pointed out that the check valves 3,4 are of a conventional structure and will not be described in more detail here, apart from to point out that they are opened as the first part 1 is led towards the second part 2 and after that the spherical cup 8 has come into contact with the cylindrical surfaces 7a. Thus no fluid leakage will occur during the connecting process.

It would be of advantage if the equatorial diameter of the spherical cup were to be made somewhat larger than the diameter of the cylindrical surfaces 7a. Thus as the coupling takes place an elastic compression of the spherical zone will occur. This may, for instance, be in the region of 0.1 mm at the equator. The thickness of the walls of the spherical cup is sufficient in relation to the pressure differential above the packer element. As can be seen from the drawing, the connecting member 6, when subjected to internal pressure, will exert compressive forces against the internal surface 8b of the spherical cup which are transmitted through the spherical cup to the contact surface between the external spherical surface 8a and the internal cylindrical surface 7a. The contact pressure thereby increases in step with the pressure differential above the connecting member 6 such that there is a sealing connection regardless of pressure, as far as the limits set by the materials and dimensions that are used allow. It will also be understood that the seal is not dependent upon the axial thrust by which the parts 1, 2, and 5 are held together, nor, as mentioned, is it dependent upon the cylindrical surfaces 7a of the respective parts 1,2 being entirely concentric or aligned with one another. This is due then to the loose attachment of the connecting member 6 in the seal plate 5, and also the spherical cups 8 that allow for the accommodation of this angle variance.

The internal part 6c of the connecting member 6 constitutes the communicating part and, in the illustrated embodiment, is in two pieces to allow for mounting from either end.

The seal plate 5 is often equipped with packers 17 against the surrounding medium, such that a enclosed volume is formed between these and the connecting members 6 for each individual pipeline 12 or check valve 3,4. Thus by pressurizing this closed volume, one can check that all the connections are sealed before the hydraulic coupling is put into use.

For manufacturing purposes, the check valves 3,4 together with the seal plate 5 are made in the form of detachable elements and are illustrated thus in the figures.

As mentioned, it is preferable that the external part 6b of the connecting member 6, optionally only the ball socket part 8, be made of a titanium alloy.

Furthermore, the external surface 8a of the spherical cups 8 can be plated or surface-treated in another manner, e.g., with silver, gold, lead or a white metal which has the capacity to deform easily and adapt to unevennesses in the surface against which it will act. This is done to further ensure the seal between the spherical surface 8a and the cylindrical surface 7a.

Figure 4:
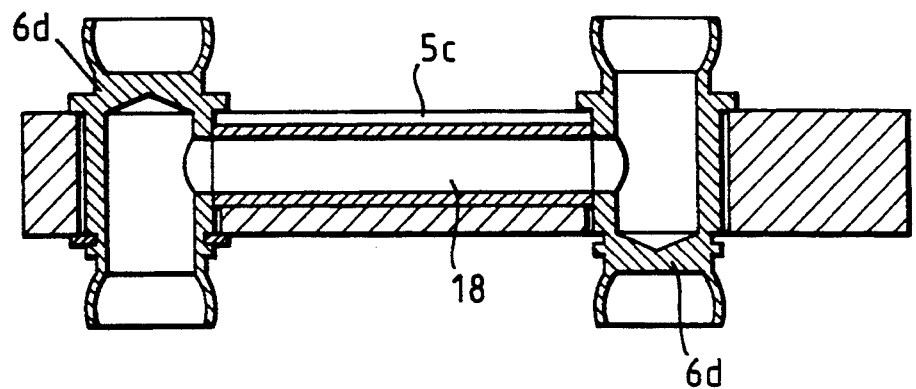
FIG. 4 is a schematic illustration of a section through a replacement seal plate for redirecting the fluid flow.
Figure 5:
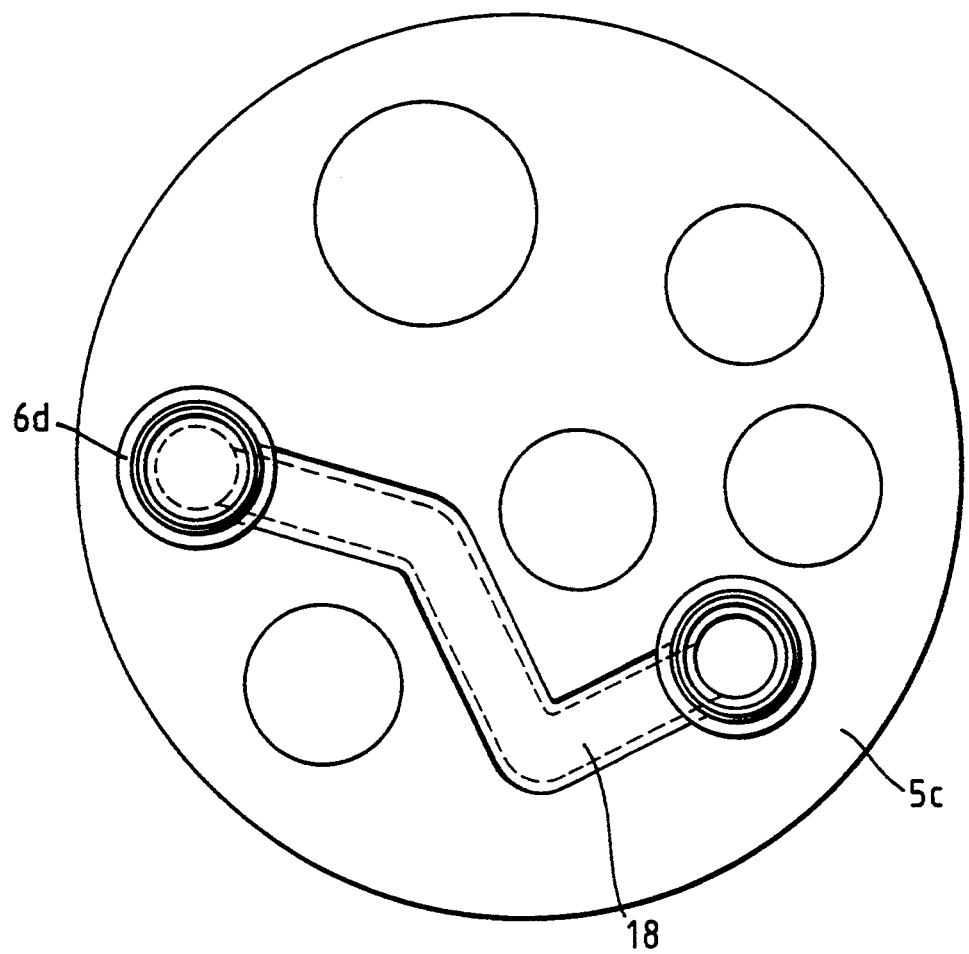
FIG. 5 is a schematic illustration of the seal plate according to FIG. 4, seen from above.

Reference is now made to FIGS. 4 and 5. Leakages or other faults do sometimes occur in valves and similar in subsea installations. It may then be desirable to be able to redirect hydraulic couplings. For this purpose, a replacement seal plate 5c is provided that can replace the previous seal plate 5. This need can be met by the connecting members 6 not being subjected to too great an axial thrust. The seal plate 5c is made with one or more grooves or channels 18 (only one is illustrated here) and pairs of connecting members 6 are connected via the channels 18. As shown, the connecting members 6d are blanked off at one end. By means of this structure, the fluid that is transported through one pipe can also be distributed to two pipes or redirected from one pipe to another, by replacing the original seal plate 5 with a plate 5c as shown in FIGS. 4 and 5.

It should be mentioned that attempts at using a similar solution with a large AX packer would be hazardous because the unsymmetrical connecting member here could bend under the great axial thrust which is needed for sealing.

Having described our invention, we claim:

1. A hydraulic coupling comprising a first part having at least one check valve, a second part having at least one check valve, a seal plate designed to be placed between the first and second parts, orienting members which orient said first part, said second part and said seal plate in relation to one another, and at least one connecting member disposed in the seal plate to form communication between the interdependent check valves, characterized in that in an extension of each check valve there is disposed a cylindrical surface, the centre axis of which coincides with that of the check valves, and said connecting member is at each end formed with partial, open spherical cups for external sealing interaction with the cylindrical surfaces, the internal spherical surfaces being subjected to the same pressure as that in the medium which passes through the valves and the connecting member for the purpose of actuating the radial forces in the spherical cup.

2. A hydraulic coupling according to claim 1, characterized in that the material in the spherical cup of the connecting member is chosen to have a greater modulus of elasticity than the material in the extension.

3. A hydraulic coupling according to claim 1, characterized in that each connecting member is loosely fixed in the seal plate for the purpose of accommodating the angle variance between the check valves in the respective first and second parts.

4. A hydraulic coupling according to claim 1, characterized in that each connecting member is made of a titanium alloy.

5. A hydraulic coupling according to claim 1, characterized in that said cylindrical surface is slightly conical or convex at the insertion end.

6. A hydraulic coupling according to claim 1, characterized in that the external diameter of the spherical cup is somewhat larger than the diameter of the internal cylindrical surface.

7. A hydraulic coupling according to claim 1, characterized in that said cylindrical surface is slightly conical and decreases in conicity from 0° to 10° in the direction of the check valve.

8. A hydraulic coupling according to claim 1, characterized in that the spherical cups are plated or surface-treated in some other manner, preferably with silver, gold, lead or a white metal.

9. A hydraulic coupling according to claim 1, characterized in that the seal plate is replaceable with one plate which is capable of dividing or redirecting fluid between different valves (FIGS. 4 and 5).

* * * * *